United States Patent [19]

Ikeuchi et al.

[11] Patent Number: 4,965,445
[45] Date of Patent: Oct. 23, 1990

[54] ROTATION ANGLE DETECTOR WITH OUTWARDLY EXTENDING RADIAL PROJECTIONS

[75] Inventors: Masayuki Ikeuchi; Koichi Okamura, both of Hyogo, Japan

[73] Assignee: Mitsubishi Denki Kabushiki Kaisha, Tokyo, Japan

[21] Appl. No.: 372,591

[22] Filed: Jun. 28, 1989

[30] Foreign Application Priority Data

Aug. 5, 1988 [JP] Japan .............................. 63-103202[U]

[51] Int. Cl.$^5$ .............................................. G01D 5/34
[52] U.S. Cl. ............................ 250/231.13; 250/231.14
[58] Field of Search ........ 250/231 SE, 237 G, 231.13, 250/231.14, 231.15; 356/375

[56] References Cited

U.S. PATENT DOCUMENTS

| 4,031,441 | 6/1977 | Garrett | 250/231 SE |
| 4,182,953 | 1/1980 | Hurley | 250/231 SE |
| 4,389,902 | 6/1983 | Kataoka | 250/231 SE |

Primary Examiner—David C. Nelms
Assistant Examiner—Sherrie Hsia
Attorney, Agent, or Firm—Sughrue, Mion, Zinn, Macpeak and Seas

[57] ABSTRACT

A rotation angle detector comprises a case housing a rotary shaft, a detection unit including a detection element and a processing circuit, and plural projections provided on an outside circumferential surface of the detection unit so as to put in contact with an inside circumferential surface of the case.

5 Claims, 2 Drawing Sheets

ROTATION ANGLE DETECTOR WITH OUTWARDLY EXTENDING RADIAL PROJECTIONS

BACKGROUND OF THE INVENTION

The present invention relates to a rotation angle detector which can be preferably used for the ignition device of an internal combustion engine or the like.

FIGS. 1 and 2 show a major part of conventional rotation angle detector for the distributor of an internal combustion engine. The detector has a shaft 2 which is supported in the central portion of a case 1 so that the shaft is rotated synchronously with the rotation of the engine. A disk 3, which has a prescribed number of through holes 31 at intervals in the circumferential direction of the disk, is secured to the shaft 2 so that the disk is rotated together with the shaft. A light emission element 4 is provided in the face of one side of the disk 3 so that the position of the element corresponds to that of each of the through holes 31 of the disk. A light reception element 5 such as a photodiode is provided in the face of the other side of the disk 3 so that the element receives light emitted from the light emission element 4 and transmitted through the holes 31 of the disk and sends out a signal corresponding to the rotation of the shaft 2. The output terminals of the light reception element 5 are connected to a processing circuit 6 made of an integrated circuit or the like, through a connector not shown in the drawings. The light emission element 4, the light reception element 5 and the processing circuit 6 are integrally assembled together so that they constitute a detection unit 7 secured to the case 1 by a plurality of screws 8, 9, 10.

When the shaft 2 and the disk are rotated together with the engine, the light emitted from the light emission element 4 is received by the light reception element 5 through the holes 31 of the disk as the light is intermittently blocked by the non-holed portion of the disk, so that the light reception element sends out the signal corresponding to the rotation of the shaft. The signal is shaped by the processing circuit 6 so that the rotation angle of the shaft 2 is detected.

However, the conventional rotation angle detector has a problem that the light emission element 4 and the light reception element 5 are likely to be improperly positioned relative to the through holes 31 of the disk 3 on account of three possible causes (i), (ii), (iii). The cause (i) is the positional discrepancy between the shaft 2 and the disk 3. The cause (ii) is the positional discrepancy between the shaft 2 and the case 1. The cause (iii) is the positional discrepancy between the case 1 and the detection unit 7. Since the shaft 2 and the disk 3 are accurately fitted to each other and the case 1 and the shaft 2 are also accurately fitted to each other, the causes (i) and (ii) are substantially eliminated. However, since the detection unit 7 is attached to the case 1 by the plural screws 8, 9, 10 extending through screw holes which are provided in the detection unit so as to define a clearance between the unit and each of the screws to cope with the inaccuracy of the positions of the screw holes, the cause (iii) cannot be eliminated. The positional discrepancy between the case 1 and the detection unit 7 consists of components in the radial and circumferential directions of the case. Since each of the components acts to deteriorate the performance of the rotation angle detector, both the components are undesirable.

SUMMARY OF THE INVENTION

The present invention was made in order to solve the above-described problem of the conventional rotation angle detector.

Accordingly, it is an object of the present invention to provide a rotation angle detector which is prevented of the positional discrepancy between the case and detection unit of the detector by a simple construction and is easy to assemble.

A plurality of projections are provided on the outside circumferential surface of the detection unit so that the projections are put in contact with the inside circumferential surface of the case to properly position the unit relative to the case or the shaft of the detector when the detector is assembled.

For that reason, the detection unit can be easily and accurately positioned relative to the shaft or the case by simple construction.

DETAILED DESCRIPTION OF EMBODIMENT

An embodiment of the present invention is hereafter described in detail with reference to the drawings attached hereto.

Figure 1:
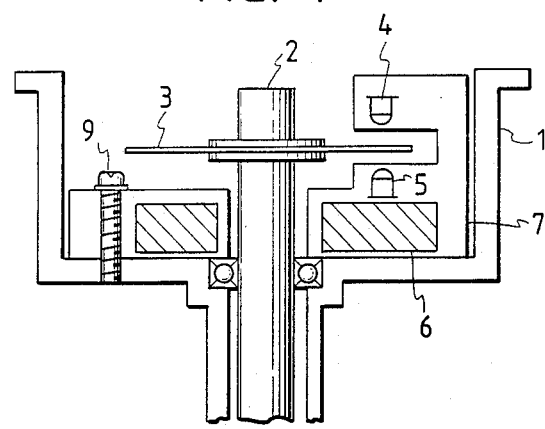
FIG. 1 is a longitudinally sectional view of a major part of a conventional rotation angle detector.
Figure 2:
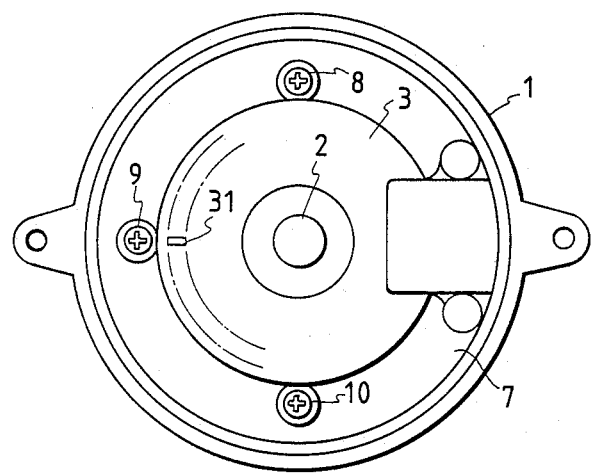
FIG. 2 is a plan view of the major part of the conventional detector.
Figure 3:
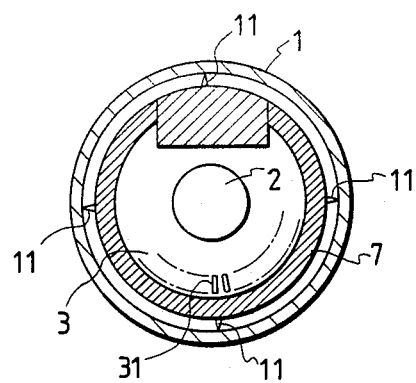
FIG. 3 is a plan view of a major part of a rotational angle detector which is an embodiment of the present invention.
Figure 4:
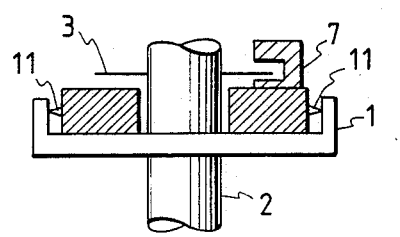
FIG. 4 is a longitudinally sectional view of the major part of the detector.

FIGS. 3 and 4 show a rotation angle detector which is the embodiment. The detector comprises a case 1, a shaft 2, a disk 3, through holes 31 provided in the disk, a detection unit 7, and a plurality of projections 11 provided on the outside circumferential surface of the detection unit so that the projections can be put in contact with the inside circumferential surface of the case 1. The projections 11 are made of the same plastic as the detection unit 7 integrally therewith. The detector detects the rotation angle of the shaft 2 on the same principle as the above-described conventional rotation angle detector.

When the detection unit 7 is to be positioned relative to the shaft 2 or the case 1 in the radial direction thereof, the unit is fitted in the case so that the projections 11 on the outside circumferential surface of the unit simultaneously come into contact with the inside circumferential surface of the case. For that reason, the detection unit 7 is positioned relative to the shaft 2 or the case 1 in a nearly automatic manner. It is preferable that the projections 11 are provided at equiangular intervals on the outside circumferential surface of the detection unit 7 along the total circumference thereof to perform the positioning thereof. In order to position the detection unit 7 relative to the shaft 2 or the case 1 in the circumferential direction thereof, a conventional means such as providing a mark on the top of the detection unit 7 and another mark on the top of the case 1 in advance and making the marks coincide with each other when fitting the detection unit in the case can be used. The mark for the case 1 may be provided on the inside circumferential surface thereof so as to coincide with one of the projections 11 when the detection unit 7 is fitted in the case so as to be positioned thereto.

The present invention is not confined to the above-described embodiment, but may be embodied or practiced in other various ways without departing from the spirit from or essential character thereof. For example, the number of the projections 11 and the form and material of each of them are not confined to the embodiment shown in FIGS. 3 and 4. Although the rotation angle detector is of such an optical type as including a light emission element and a light reception element similarly to the above-described conventional rotation angle detector, the present invention is not confined to the type.

What is claimed is:

1. A rotational angle detector comprising:
    a case for housing a rotary shaft; and
    a detection unit including;
        a detection element provided between said case and said shaft so as to send out a signal corresponding to a rotation of said shaft, and
        a processing circuit for processing said signal and sending out a signal corresponding to a rotational angle of said shaft; and
        at least three projections provided on an outside circumferential surface of said detection unit and extending outwardly from said unit in a direction that is radial with respect to said shaft so as to be in contact with an inside circumferential surface of said case.

2. A rotation angle detector as claimed in claim 1, wherein said detection element includes a disk having a prescribed number of through holes at intervals in a circumferential direction thereof; a light emission element provided in the face of one side of the disk; and a light reception element provided in the face of the other side of the disk to receive light emitted from said light emission element.

3. A rotation angle detector as claimed in claim 1, wherein said projections are provided at equiangular intervals on the outside circumferential surface of the detection unit.

4. A rotation angle detector as claimed in claim 1, wherein a mark is provided on the inside circumferential surface of said case so as to coincide with one of said projections.

5. A rotation angle detector as claimed in claim 1, wherein a first mark provided on the top of said case is made coincide with a second mark provided on the top of said detection unit.

* * * * *